Patented Dec. 3, 1935

2,022,924

UNITED STATES PATENT OFFICE 2,022,924

MARGARINE AND METHOD OF MAKING THE SAME

Marvin C. Reynolds, Chicago, Ill.

No Drawing. Application July 27, 1933, Serial No. 682,423

7 Claims. (Cl. 99—13)

My invention relates to new and improved margarine and method of making the same.

Margarines in general are made with either animal or vegetable oils or fats emulsified with an aqueous liquid, the vegetable type being known in the industry sometimes as nut margarine. Margarines of this type contain a mixture of various oils, each manufacturer in general having his own formula. These formulas have always had certain things in common, principally in that in all of them a substantial quantity of a vegetable fat, solid at room temperature, is used. Examples of such solid vegetable fats are coconut oil, palm kernel oil, yellow or beached palm oil, and the like. Sometimes the formula includes a certain amount of hydrogenated fats or hydrogenated oils such as, for example, hydrogenated cottonseed oil, peanut oil, or the like, but in all cases a substantial amount of the normally solid oil or fat is used in order that the oleaginous constituent of the margarine emulsion may have the proper melting point.

It has been suggested that certain advantages may result by employing in margarine only fats or glycerides which are normally liquid at room temperature. Heretofore, however, it has been impossible to produce satisfactory margarine made exclusively with oils of this type. In order to make a satisfactory margarine having the desired plasticity at room temperature to permit it to be spread readily on bread, the liquid oil must be hydrogenated. It is well known that when a glyceride such as cottonseed oil, for example, is partially hydrogenated, all portions thereof do not become hydrogenated to the same extent; but there will be a fraction which will be substantially completely hydrogenated and may have a melting point of approximately 140° F.; there may be a fraction which is substantially unaffected by the hydrogenation; and there will be fractions between the two extremes. If a normally liquid glyceride is hydrogenated until it has a clearing point of 98° to 100° F., the margarine produced thereby will be too soft and will not possess the proper body at ordinary temperatures. If, however, the oil is hydrogenated to a point where it will produce a margarine having the proper body, say to have a clearing point of 106° to 108° F., then the resulting product will not melt readily in the mouth and will produce a sensation of gumminess, and will substantially mask the taste of the margarine.

The principal object of the present invention is the provision of an improved margarine.

Another object is the provision of a satisfactory margarine product made entirely from oils normally liquid at room temperature.

Another object is the production of margarine from normally liquid oils which will have the proper body at ordinary temperatures and will not produce the sensation of gumminess in the mouth.

Other objects and features of the invention will be apparent as the disclosure progresses.

In carrying out the present invention, I discovered that the sensation of gumminess can be obviated if the relatively higher melting point fraction of the hydrogenated oil is dispersed in the relatively lower melting point fraction. I so suspend the higher melting point glycerides by raising the temperature of the partially hydrogenated oil above the clearing point, crystallize the entire body of oil by rapid cooling, preferably in an aqueous medium, and then employ this material as the oleaginous phase of the emulsion, taking care thereafter to handle the crystallized, partially hydrogenated oil so as to maintain the higher melting point glycerides in a state of suspension.

As a specific method for carrying on the process, I select a liquid oil such as cottonseed oil for example, and partially hydrogenate the oil until it has a clearing point of approximately 106 to 108° F. The partially hydrogenated cottonseed oil is then melted at a temperature above its clearing point and then brought into contact with a body of cold water by allowing it to impinge on the water, preferably sub-dividing the oil to bring it into relatively rapid contact with the body of cold water. A very satisfactory method is to spray this oil into the water, in which case the oils strike the water in very fine particles which are very quickly crystallized. This causes a substantially instantaneous crystallizing of the partially hydrogenated oil, and also the absorption of a certain amount of the water. The resulting crystals together with some adhering water are then removed from the water bath, raised to a temperature of approximately 90 to 92° F., and the oil at this temperature churned with an additional amount of aqueous material such as cultured milk to form the substantially liquid margarine emulsion. At a temperature of 90 to 92° F. for example, the lower melting point glycerides melt carrying in suspension in the form of finely divided discrete particles the glycerides of a relatively higher melting point. The adhering moisture is, of course, also dispersed through the mass. At 90 to 92° F. the product is in the form of an opaque milky dispersion which flows readily. It is this dispersion product which is emulsified with the milk.

Except for the maintenance of temperatures substantially as indicated in the preceding paragraph, the manufacture of the margarine from this point on is substantially the same as the manufacture of any ordinary type of margarine; substantially the same modification, etc. may be made in the process, range of materials used, and the like. For example, the amount of milk employed in producing the liquid margarine emulsion at this point may comprise about 20% of the amount of fat present. The liquid margarine emulsion is crystallized to reduce it to solid form, and the product is then processed in a usual manner to produce the finally plastic margarine emulsion. Assuming that the so-called wet process of crystallization is used, after crystallizing, the crystals are tempered by raising them to a relatively higher temperature but below the melting point (by the use of temperate water); the excess moisture is squeezed out and the product is kneaded either on a butter worker or by means of rollers, or in any of the usual ways to produce a plastic mass of butter-like consistency.

Instead of employing only a single oil hydrogenated to have a clearing point of 106 to 108° F., for example I may use various mixtures and still practice the method defined hereinabove to produce substantially the same results. For example, if a mixture of partially hydrogenated peanut oil and corn oil is employed, the method may be substantially the same as described in connection with glyceride from a single source. In place of using an oil having a clearing point of 106 to 108° F. for example, I may employ an oil having a clearing point of approximately 105° F., and add thereto 3 to 4% of a substantially completely hydrogenated normally liquid glyceride having a melting point of approximately 140° F., such as hardened cottonseed oil. When employing the latter modification the oils are melted together until the resulting product is clear; the oil is then subjected to crystallization in cold water, the crystals partially melted at a temperature of from 90 to 92° F., and margarine emulsion produced in a churn as described.

In describing my improved method hereinabove in order that those skilled in the art may understand how to practice the same, it is to be understood that I am not by any means limited to the specific features described. For example, in place of hydrogenated cottonseed oil, I may use corn oil, peanut oil, or any of the various liquid oils either in a pure condition or mixed. They are hydrogenated to a temperature above the body temperature to produce the proper consistency at ordinary temperatures, and treated to prevent the fraction melting above body temperature from producing the sensation of gumminess. Independent of what source of oil is employed the product produced by the process will have the proper texture at ordinary temperatures and still will not contain any coconut oil, palm kernel oil, palm oil, or any other vegetable fat which is solid at ordinary temperatures. The margarine so produced will have a good spreading value without being appreciably gummy when eaten.

In employing the term margarine throughout the specification, it is understood that the term is used in the usual way to mean a combination of oils and fats together with a certain amount of moisture to produce a product equivalent to butter in spreading value. The moisture content of such products usually ranges from 8 to 16%.

Those skilled in the art are referred to the co-pending application of Epstein, Reynolds and Harris, Serial No. 682,424 filed July 27, 1933, now Patent No. 1,958,697, describing another method for accomplishing the objects of the present invention.

The invention is not limited by the specific features described but only as set out in the appended claims.

What I claim as new and desire to protect by Letters Patent of the United States is:

1. The method of making margarine which comprises hydrogenating normally liquid vegetable oil to a point at which it is solid at room temperature, melting the oil at a temperature above its clearing point, crystallizing the same, heating the oil to a temperature below its clearing point to melt the relatively lower melting point constituents, churning the oil with an aqueous liquid to form a relatively liquid emulsion, crystallizing the emulsion to solidify the same, and processing the solid emulsion to form a final plastic margarine product.

2. The method of making margarine which comprises hydrogenating normally liquid vegetable oil to a point at which it is solid at room temperature, melting the oil at a temperature above its clearing point, projecting the oil into a body of refrigerated liquid to crystallize the same, heating the oil to a temperature below its clearing point to melt the relatively lower melting point constituents, churning the oil with an aqueous liquid to form a relatively liquid emulsion, crystallizing the emulsion to solidify the same, and processing the solid emulsion to form a final plastic margarine product.

3. In the method of making margarine from liquid vegetable oil, the steps comprising partially hydrogenating the liquid oil, melting the oil at a temperature above its clearing point, crystallizing the same, and finally heating below the clearing point to suspend relatively discrete particles of relatively higher melting point constituents in the relatively lower melting point portion of the oil.

4. The method of making margarine which comprises hydrogenating liquid vegetable oil until it has a clearing point above 100° F.; heating the resulting partially hydrogenated oil above the clearing point, crystallizing the same in an aqueous liquid, reheating the oil at a temperature below 100° F. to liquefy a portion of the same, churning the oil with an aqueous liquid to form a substantially liquid emulsion, and thereafter processing the emulsion to form a plastic emulsion mass of butter-like consistency.

5. The method of making margarine which comprises hydrogenating liquid vegetable oil until it has a clearing point of approximately 106° F. to 108° F., melting the partially hydrogenated oil, crystallizing the same, reheating the oil product to a temperature below 100° F., churning the oil with an aqueous liquid to produce a substantially liquid emulsion, crystallizing the emulsion, and finally processing the crystallized emulsion to form a plastic mass of butter-like consistency.

6. The method of making margarine which comprises hydrogenating liquid vegetable oil until it has a clearing point of approximately 106° F. to 108° F., melting the partially hydrogenated oil, projecting the oil into a body of cold aqueous liquid, reheating the oil product to a temperature below 100° F., churning the oil with an aqueous liquid to produce a substantially liquid emulsion, crystallizing the emulsion, and finally processing the crystallized emulsion to form a plastic mass of butter-like consistency.

7. The method of making margarine which comprises hydrogenating liquid vegetable oil until it has a clearing point of approximately 106° F. to 108° F., melting the partially hydrogenated oil, projecting the melted oil into a body of cold aqueous liquid to crystallize the same, reheating the crystals to approximately 90° F. to suspend adhering moisture and higher melting point oily constituents in the liquid portion thereof, churning the oil product with an aqueous liquid to form a substantially liquid emulsion, crystallizing the same and finally processing the crystallized emulsion to produce a plastic emulsion mass of butter-like consistency.

MARVIN C. REYNOLDS.